July 17, 1934.  C. R. BLUZAT  1,966,878
LAMINATION APPLYING MACHINE
Original Filed May 13, 1932  6 Sheets-Sheet 1
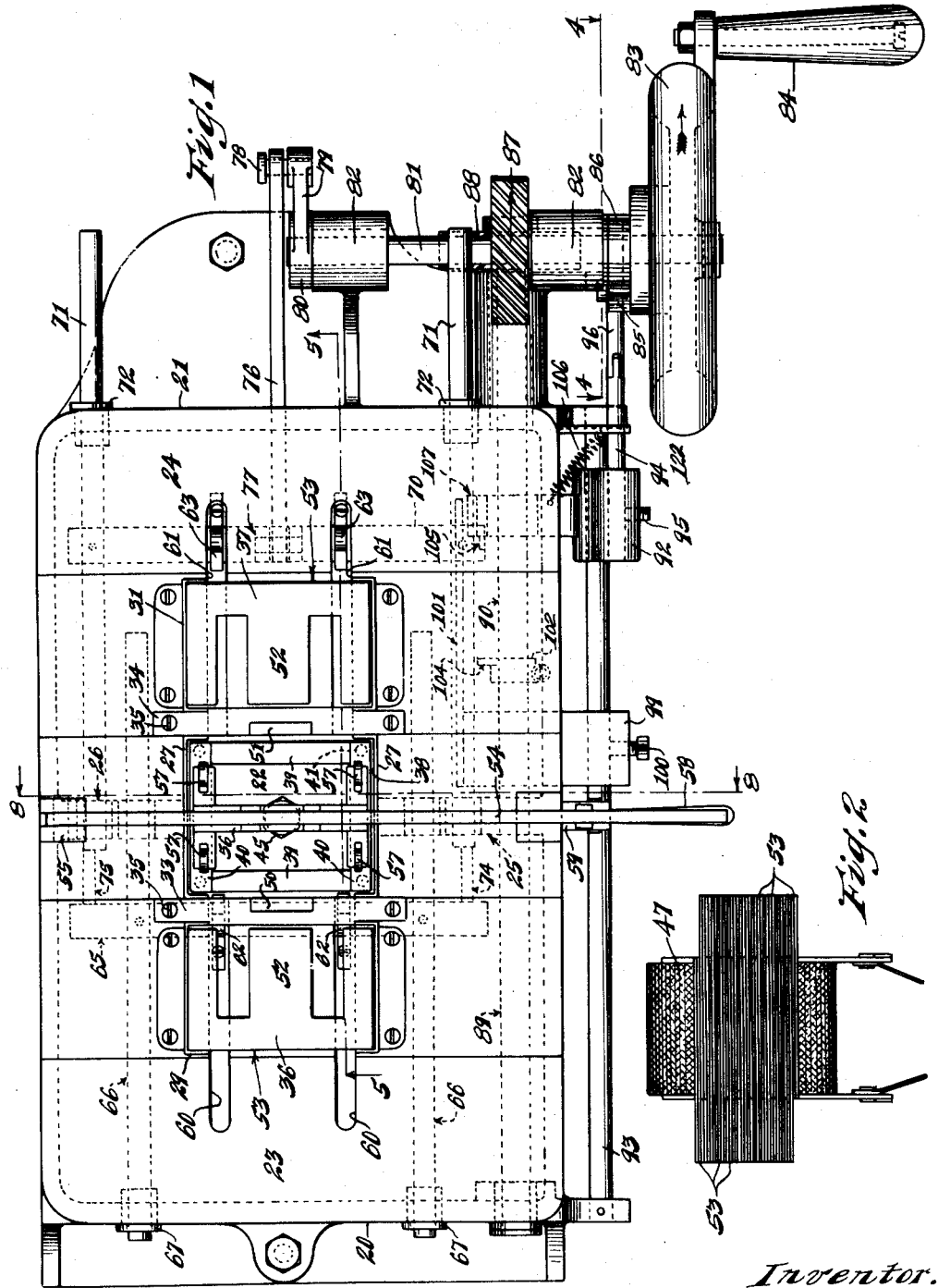
Witnesses:
E. E. Wessels
Anita E. Matson
Inventor:
Claude René Bluzat,
By Joshua R. H. Potts
his Attorney.

July 17, 1934.　　　C. R. BLUZAT　　　1,966,878
LAMINATION APPLYING MACHINE
Original Filed May 13, 1932　　6 Sheets-Sheet 2
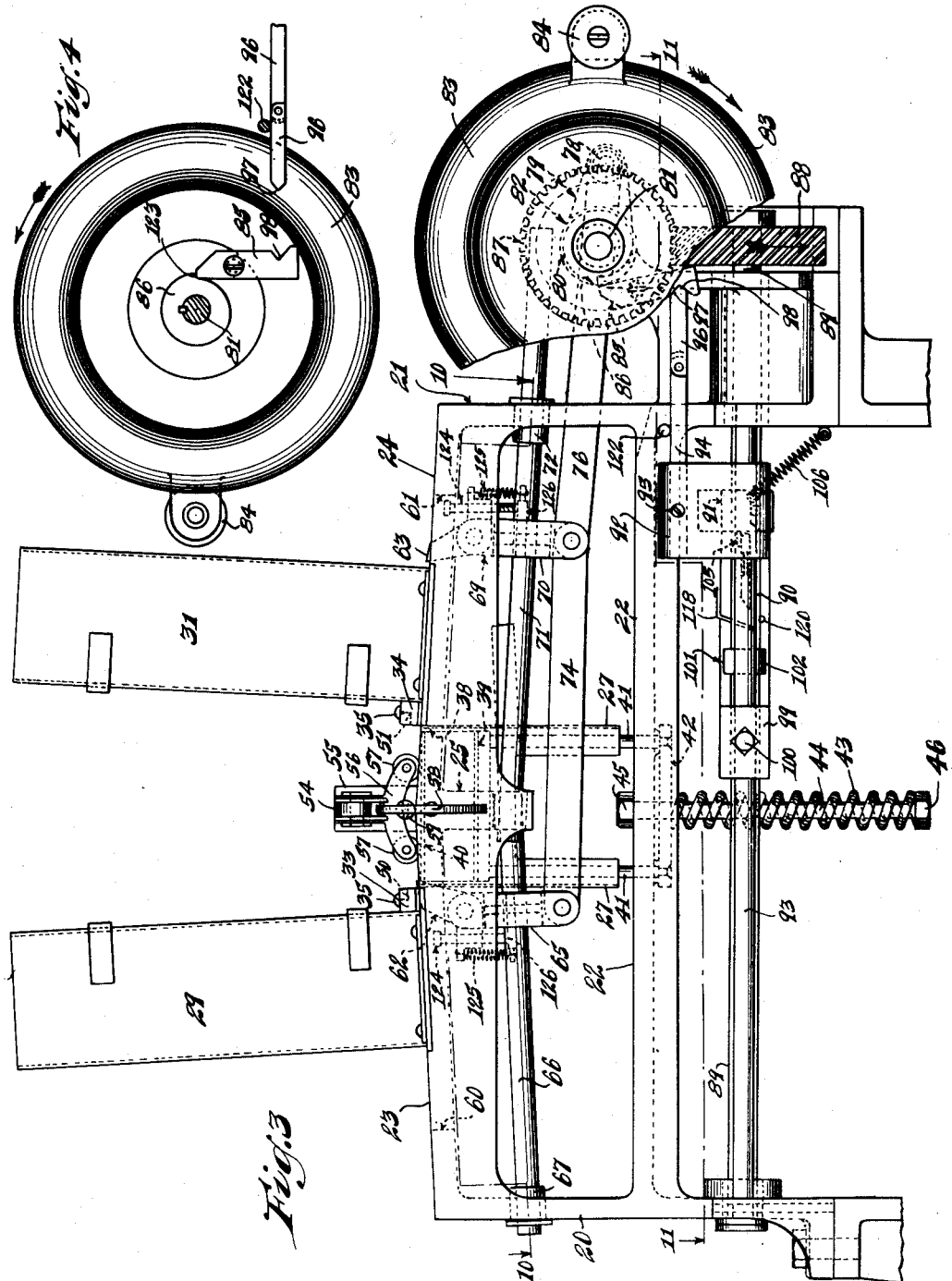

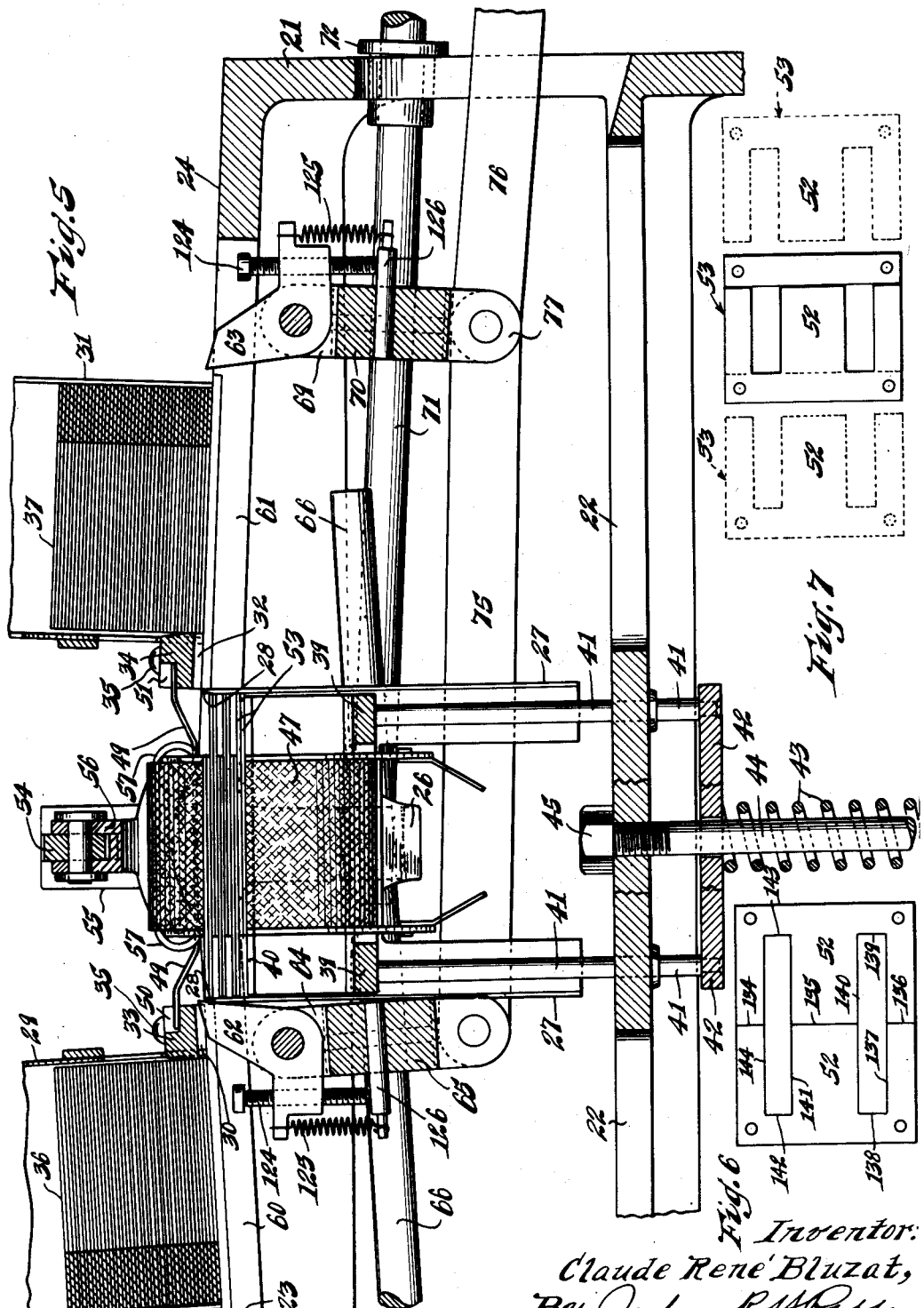

July 17, 1934.  C. R. BLUZAT  1,966,878
LAMINATION APPLYING MACHINE
Original Filed May 13, 1932  6 Sheets-Sheet 4

Witnesses:

Inventor:
Claude René Bluzat,
By Joshua R.H. Potts
his Attorney.

July 17, 1934.  C. R. BLUZAT  1,966,878
LAMINATION APPLYING MACHINE
Original Filed May 13, 1932    6 Sheets-Sheet 5
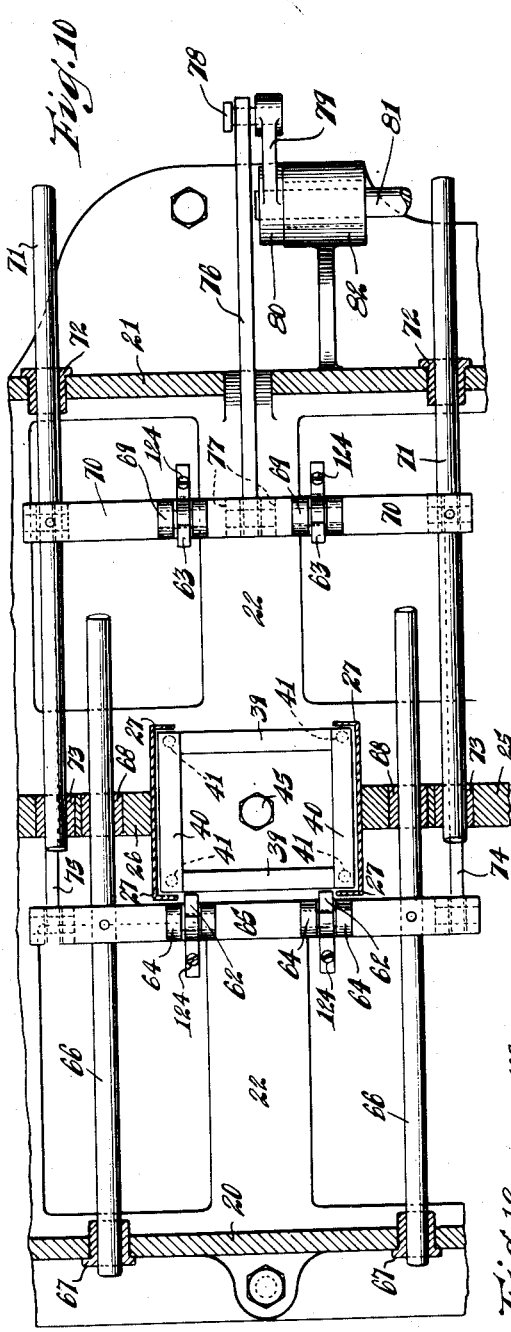
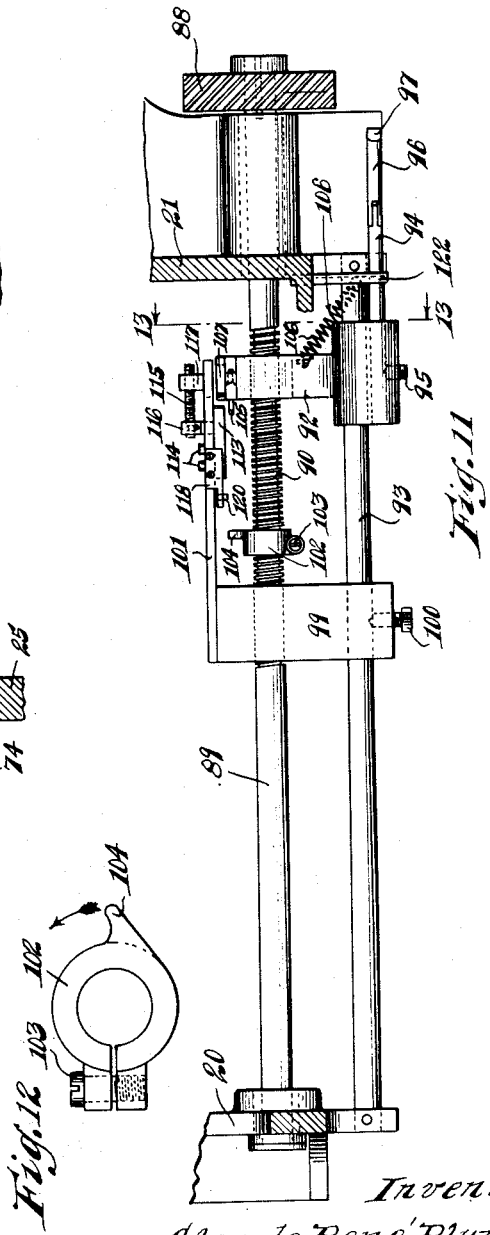
Inventor:
Claude René Bluzat,
By Joshua R. H. Potts
his Attorney.

July 17, 1934.  C. R. BLUZAT  1,966,878
LAMINATION APPLYING MACHINE
Original Filed May 13, 1932   6 Sheets-Sheet 6
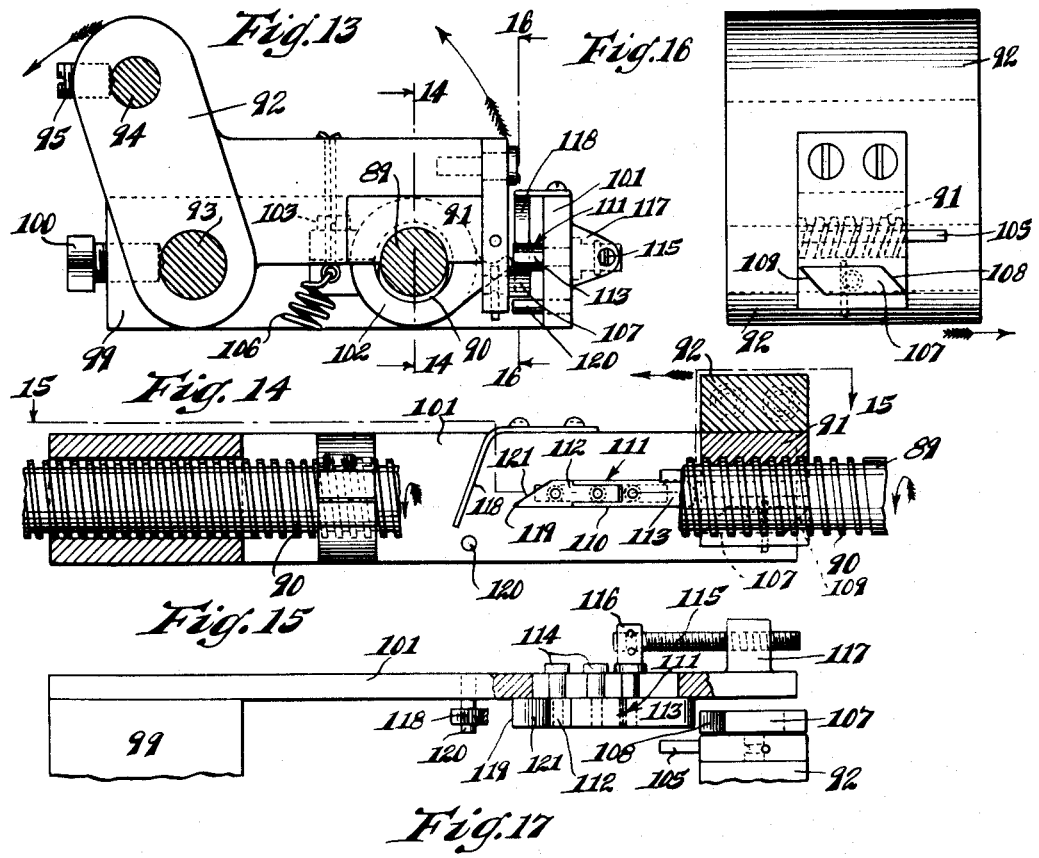
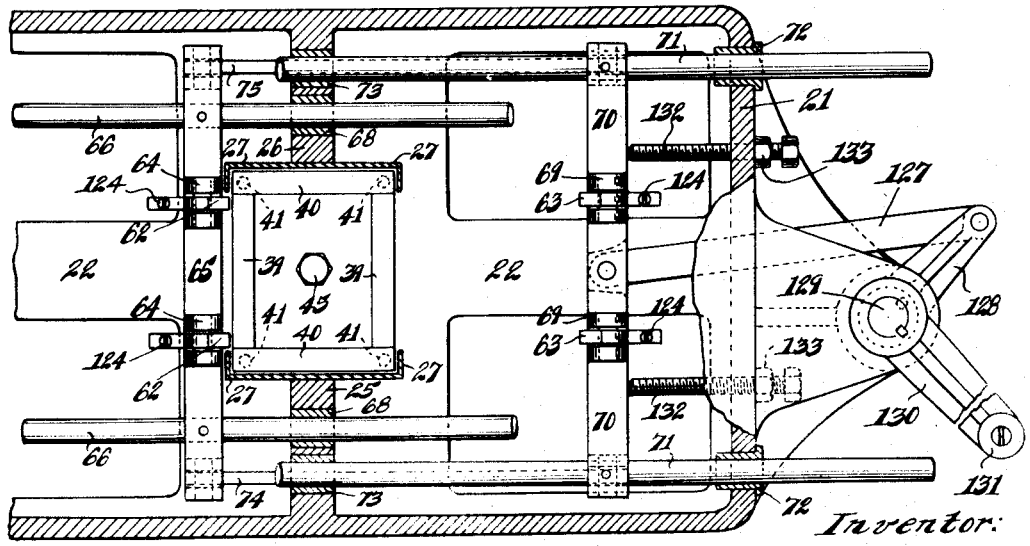
Witnesses:
E. E. Wessels
Aasta E. Matsen
Inventor:
Claude René Bluzat,
By Joshua R. H. Potts
His Attorney.

Patented July 17, 1934

1,966,878

UNITED STATES PATENT OFFICE 1,966,878

LAMINATION APPLYING MACHINE

Claude René Bluzat, Oak Park, Ill., assignor to Standard Transformer Corporation, Chicago, Ill., a corporation of Illinois Application May 13, 1932, Serial No. 611,219
Renewed February 26, 1934

7 Claims. (Cl. 29—84)

This invention relates to a lamination applying machine, and an object of the invention is the provision of a machine for applying laminations to comprise the laminated core of an electrical coil such as a transformer or the like. A further object of the invention is the provision of a machine designed to insert the lamination plates in alternate relation from opposite directions whereby the laminated core is evenly and uniformly built up. As an additional object, the machine of the present invention is designed to apply laminations with great rapidity and accuracy whereby the cost of manufacture of coils having laminated cores is greatly reduced and an improved article produced. A further object is the provision of improved means in a machine of the type indicated whereby the number of alternate plates inserted from opposite directions may be increased or decreased, and the machine is also provided with mechanism for automatically releasing and disengaging the lamination plates when a predetermined number have been applied to a coil.

Other objects will appear hereinafter.

The invention consists in the combinations and arrangements of parts hereinafter described and claimed.

The invention will be best understood by reference to the accompanying drawings, forming a part of this specification, and in which:

Fig. 1 is a plan view of the machine;

Fig. 2 is a side elevational view of an electrical coil, such as a transformer coil, for example, after the laminations have been applied by the machine of the present invention;

Fig. 3 is a front elevational view of the machine;

Fig. 4 is a vertical sectional view, taken substantially on the line 4—4 of Fig. 1, but with the driving pawl in engaged position;

Fig. 5 is an enlarged sectional view, taken substantially on the line 5—5 of Fig. 1, showing a coil in position in the machine to receive laminations, and with a number of laminations applied to indicate an intermediate stage in the operation;

Figures 8, 9:
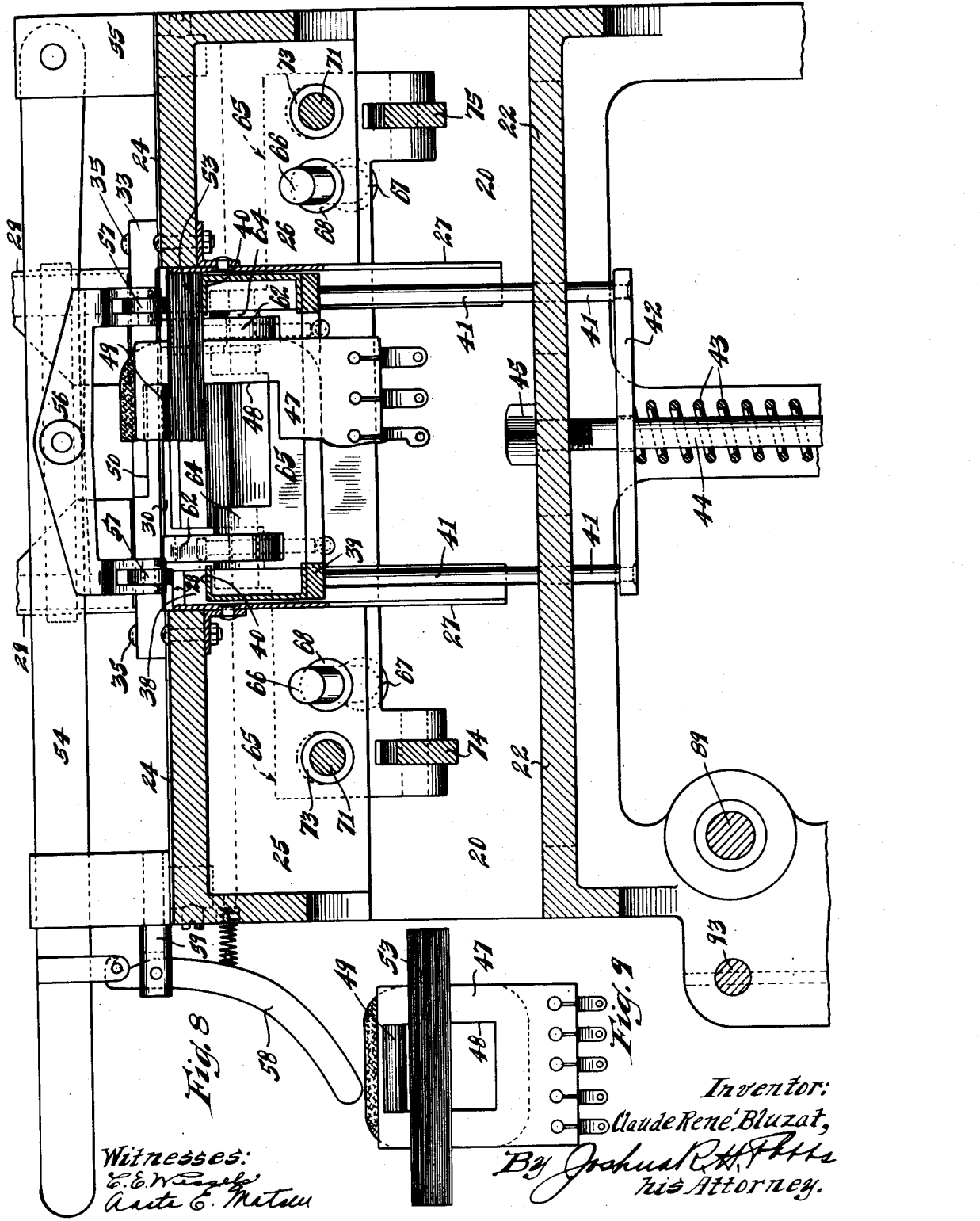

Fig. 6 is a plan view of a blank from which the particular type and shape of laminations used for illustrative purposes are cut. In the particular embodiment of the invention disclosed each lamination has the general contour of the letter E whereby the center leg is inserted in the central opening of the coil and the top and bottom legs extend on opposite outer sides of the coil. In cutting these laminations from a blank, as shown in Fig. 6, the cut out portions between the legs are of a size to enable them to be used as filler plates between lamination pieces after the coil has been removed from the machine.

Fig. 7 is a view showing two laminations in opposed relationship and also in overlapped relationship, in accordance with the position assumed after application to a coil;

Fig. 8 is an enlarged sectional view, showing a coil with a number of laminations applied, partly in elevation, taken substantially on the line 8—8 of Fig. 1;

Fig. 9 is an end view of a coil with a number of laminations applied, to illustrate the coil and laminations at the same stage of procedure as shown in Fig. 8;

Fig. 10 is a horizontal sectional view, illustrating the lamination feeding mechanism and guide rods, taken substantially on the line 10—10 of Fig. 3;

Fig. 11 is a horizontal sectional view of the releasing mechanism and lamination measuring device, taken substantially on the line 11—11 of Fig. 3;

Fig. 12 is a view of the releasing dog used in the releasing mechanism;

Fig. 13 is a vertical sectional view, taken substantially on the line 13—13 of Fig. 11;

Fig. 14 is a vertical sectional view, taken substantially on the line 14—14 of Fig. 13;

Fig. 15 is a sectional view, taken substantially on the line 15—15 of Fig. 14;

Fig. 16 is an elevational view, taken substantially on the line 16—16 of Fig. 13. Figs. 12 to 16, inclusive, are detail views of the lamination measuring and disengaging mechanism.

Fig. 17 is a view showing a modified form of means for operating the lamination feeding carriage.

As illustrated in the drawings, the machine is mounted upon and associated with a suitable frame comprising a left wall 20, right wall 21, intermediate horizontal frame member 22, left table 23, and right table 24. As shown in Figs. 4 and 5, the left and right tables incline upwardly toward the center of the machine, which is a special provision for feeding laminations in an upwardly inclined direction from opposite sides, as hereinafter more fully explained.

Mounted beneath the central portion of the machine is a forward partition 25 and a rear partition 26 adapted to serve as supports for guiding the rods on the feeding carriage. The forward and rear partitions 25 and 26 also serve as supports for four vertically extending lamination guide members 27, L-shaped in horizontal section, and adapted to serve as guides for the laminations in a downward vertical direction after application to a coil. As particularly shown in Fig. 5, the upper extremities of the guide members 27 are beveled, as at 28, to facilitate initial introduction between the respective members. Mounted upon the left table 23 is a left lamination magazine 29 having a feeding slot 30, and correspondingly there is mounted upon the right table 24 a right lamination magazine 31, having a lamination feeding slot 32.

Mounted immediately above the left slot 30 and table 23 is a left shoe member 33, and associated with the right table 24 and right feeding slot 32 there is a corresponding right shoe member 34. Members 33 and 34 are secured to the respective tables by machine screws 35 and, as shown in Fig. 5, they are spaced above the tables a sufficient distance to allow the passage of two laminations from each side in accordance with the present disclosure.

The machine is provided with means for increasing or decreasing the number of laminations fed at each operation, and to accommodate an increase in the number, shim pieces may be inserted below the shoes 33 and 34 at points adjacent the machine screws 35 to provide greater clearance.

The laminations proper may be composed of soft iron or any suitable metal for the purpose, and the weight of the laminations 36 in the left magazine 29, as well as the weight of the laminations 37 in the right magazine 31, serves to maintain the lowermost laminations in a flat position flush with the respective tables 23 and 24 to provide for smoothness of operation in connection with the shearing or feeding of the laminations from the bottom of the respective piles.

Adjacent the center of the upper surface of the machine is a rectangular opening 38 which is bounded at the four corners by the vertically extending guide members 27, and which permits of the introduction of the lamination supporting frame 39, as well as the introduction of the coil which is to receive the laminations. The lamination supporting member or frame 39 is provided with upwardly extending angle shaped members 40 which are spaced apart to permit passage of the lamination feeding dogs or pawls, hereinafter described, and upon which the laminations directly rest after being fed. The lamination supporting frame 39 rests upon four posts 41 which are vertically slidable in the horizontal frame member 22, and the lower extremities of which are secured to plate 42, as shown in Figs. 5 and 8.

Plate 42, carrying the vertical posts or rods 41, is normally urged upwardly by means of a compression spring 43 surrounding a stationary but adjustable rod 44, the upper extremity of which is maintained in position by nut 45 and the lower extremity of which carries an enlarged head 46 adapted to serve as an abutment for the compression spring 43.

As shown in Figs. 1 and 10, the frame 39 has a large central opening within which is inserted a coil 47, which is also provided with a central transverse opening 48 for the reception of the central legs of the laminations fed from opposite directions. After insertion, the coil 47 is maintained in lamination receiving position by a suspension plate 49, as shown in Fig. 5, the ends of which rest in pockets 50 and 51 provided in the shoe members 33 and 34, respectively. Not only does the suspension plate 49 serve to suspend the coil 47 in lamination receiving position, but it also serves as an upper guide for the central legs 52 of the E-shaped laminations 53 as the central legs are inserted in the coil opening 48. It will be understood that the laminations in the magazines 29 and 31 are arranged so that the leg extensions point toward the center of the machine and toward the coil 47.

In carrying out the feeding operation there is also provided a hold-down or depressing device consisting of an elongated arm 54, pivoted adjacent the rear edge of the machine on bracket 55, and extending a considerable distance in advance of the forward edge, as shown in Fig. 8. Pivotally mounted upon arm 54, normally at a point above the central opening 38, is a carrier 56 provided with four legs within which are pivoted rollers 57. Carrier 56 is preferably pivoted to the arm 54 to accommodate any slight variation in the position of the parts which might occur in the feeding operation. As shown, there is a pair of rollers 57 above each angle member 40, and upon commencement of operation the members 40 are elevated to a position in contact with rollers 57.

Prior to the introduction of a coil in the machine, the arm 54, together with the carrier 56, is swung upwardly, but after introduction of a coil into the machine for support by the suspension plate 49, the arm 54 is swung downwardly to the position shown in Fig. 8 and is held in this position by means of a hooked latch 58, pivoted upon bracket 59, and provided with a hook adapted to engage a pin mounted on the arm 54, as shown in Fig. 8. The arm 54 is held in this position until the coil is filled with the adequate number of laminations, after which latch 58 is released, arm 54 swung upwardly, and the coil provided with the laminations withdrawn upwardly through the opening 38.

Referring to Fig. 1, the left table 23 and the right table 24 are provided with left slots 60 and right slots 61, respectively, to permit the passage of a pair of left feeding dogs 62 and a pair of right feeding dogs 63. The left feeding dogs 62 are pivotally mounted between ears 64 which project upwardly from left cross brace 65 which is pinned to guide rods 66, as particularly shown in Fig. 10. Guide rods 66 are arranged to slide in bushings 67 provided in the left wall 20, and are also slidably mounted in bushings 68 provided in the partitions 25 and 26. The right feeding dogs 63 are similarly pivoted between ears 69 which project upwardly from cross brace 70 pinned to the right guide rods 71 which are arranged to slide within bushings 72 mounted in the right wall 21, and also in bushings 73 mounted in the partitions 25 and 26. These members are adapted to reciprocate in unison, and this is accomplished by means of connecting links 74 and 75 pivoted between ears integral with the left cross member 65 and the right cross member 70. The upward inclination of the left rods 66 and the right rods 71 is necessary because of the upwardly converging inclination of the tables 23 and 24, and therefore it will be understood that the dogs 62 and 63 do not travel in a true horizontal direction, but travel on an upward inclination during each feeding operation.

Reciprocation of the entire feeding carriage, including the guide rods and feeding dogs, is carried out through the medium of a connecting link 76, one end of which is pivoted between ears 77 provided on the right cross member 70, and the opposite end of which is pivoted to a crank pin 78 carried by crank arm 79 mounted on collar 80, keyed to the drive shaft 81 journaled in bearings 82.

Loosely mounted on the forward portion of the drive shaft 81 is a weighted wheel 83 for maintaining uniform speed in operation, and which carries operating handle 84. Pivotally mounted upon the side of wheel 83 opposite the handle 84 is a driving pawl 85 which is normally adapted to engage a single tooth ratchet wheel 86 keyed to shaft 81, as shown in Fig. 4. There is also keyed to the shaft 81 a helical gear 87 which meshes with a helical gear 88, shown in Fig. 11, keyed to shaft 89 suitably journaled in the left and right walls 20 and 21.

Shaft 89 is provided with a threaded portion 90, the threads of which are preferably of the square type as shown in Fig. 14, and which mesh with a half-nut 91 which is mounted upon a traveler 92, as shown in Fig. 11. Traveler 92 is slidably mounted upon rod 93, secured in the frame of the machine as shown in Fig. 11, and traveler 92 also carries a releasing plunger 94 longitudinally adjustable by means of set screw 95. Pivotally mounted upon the plunger 94 is a releasing finger 96, the downward limit of movement being in horizontal alignment with plunger 94, as shown in Fig. 4, but which is adapted to swing upwardly by reason of the pivotal mounting. The extremity of finger 96 is preferably tapered, as at 97, for engagement in notch 98 of operating pawl 85 when the traveler 92 is released, as presently described.

Mounted upon rod 93 is a frame 99 longitudinally adjustable by means of set screw 100, and which carries an arm 101 extending parallel with the shaft 89.

Internally threaded split collar 102 is adapted to be rotated upon the shaft 89 for adjustment to different positions in conformity with the thickness of the stack of laminations inserted in a coil of the machine. When this adjustment is reached, set screw 103 is tightened to bring the releasing finger 104, integral with the collar 102, in proper position to disengage the traveler 92 by lifting the half-nut 91 out of engagement with the threaded portion 90. This is accomplished by means of a pin 105 mounted upon the traveler 92, which is adapted to be engaged by the finger 104 when the limit of travel has been reached. As soon as this disengagement occurs, the traveler 92 is pulled to the initial starting position shown in Fig. 11 by means of tension spring 106, connecting the traveler 92 and the frame of the machine.

Special mechanism is provided to maintain the traveler 92 in an elevated position until the initial starting position is reached, and for this purpose there is pivotally mounted upon the traveler 92 a trigger 107 having opposite inclined faces 108 and 109. As the traveler 92 moves toward the left from the position shown in Fig. 11 the upper surface of trigger 107 contacts with the lower surface 110 of a longitudinally adjustable guide member 111 mounted upon arm 101, as shown in Fig. 14. This guide member 111 thus serves to maintain the half-nut 91 in engagement with the threaded portion 90 during the feeding operation, and guide 111 is preferably composed of two parts so as to be longitudinally adjustable for increase or decrease in length in accordance with the height of the stack of laminations to be inserted in the particular coil employed in the operation. Thus the part 111 consists of two parts 112 and 113, dovetailed together, and the former longitudinally adjustable by means of set screws 114 which extend through a slot in the arm 101. The complementary member 113 is longitudinally adjustable by means of screw 115 rotatably mounted in lug 116 which is secured to the member 113 and extends through a slot, and which is threaded in a boss 117 extending from the side of the arm 101, as shown in Fig. 15.

As the traveler 92 moves toward the left, carrying the trigger 107 and the pin 105, the inclined face 108 contacts with leaf spring 118, mounted upon arm 101, as shown in Fig. 14. This engagement has a tendency to swing the trigger 107 in a clockwise direction from the position shown in Fig. 16, which is resisted by contact of the upper surface of the trigger 107 with the lower surface 110 of member 111. However, when the upper rearmost point adjacent the inclined face 109 passes point 119 of the member 111 the trigger is released and spring 118 causes it to swing downwardly in contact with pin 120. The member 111 and the collar 102 have been so adjusted that simultaneously pin 105 is brought in the vertical path of releasing finger 104 upon the collar 102, causing elevation of the traveler 92 and consequent disengagement of the half-nut 91 with the threaded portion 90. Thereupon spring 106 pulls the traveler 92 toward the right, by reference to Fig. 11, and trigger 107 is carried upwardly by contact with the inclined surface 121 of member 111. Thereafter the lower surface of trigger 107 rides upon the upper surface of member 111, maintaining the traveler 92 in elevated position until the parts have reached the position shown in Fig. 11, ready for the commencement of the next operation.

During this return travel the releasing finger 96 passes beneath a horizontal pin 122 secured to the end wall 21, and near the conclusion of the travel the tapered extremity 97 of finger 96 engages notch 98 on the pawl 85, swinging the pawl out of engagement with the single tooth 123 of the ratchet member 86 to the position shown in Fig. 3. This operation permits the wheel 83 to rotate freely upon the shaft 81, and thus the effective operation of the machine including the lamination feed is discontinued.

Immediately following engagement of finger 96 with the pawl 85, the finger 96 is swung upwardly in a counterclockwise direction, as shown in Fig. 3, so as to be out of the path of the pawl. This disengagement of the wheel 83 indicates to the operator that the complete number of laminations have been applied to the coil, who thereupon disconnects the arm 54, removes the completed coil from the machine, and the foregoing operation is repeated.

At the conclusion of the return movement of the traveler 92 the half-nut 91 is again brought into engagement with the threaded portion 90 by reason of the fact that the trigger 107 passes beyond the right hand extremity of the member 111, as shown in Fig. 14. Therefore, rotation of wheel 83 causes the traveler to again move toward the left from the position shown in Fig. 3, and finger 96 is rocked to a horizontal position by reason of contact with pin 122. Thus not only does the mechanism act as a measuring means to cause disengagement of the operating mechanism when a predetermined number of laminations have been applied, but the mechanism automatically causes release or disengagement of the driving connection when this has been accomplished.

In the particular embodiment of the invention disclosed, laminations having E-shaped formation are illustrated, but it is to be understood that laminations of other configuration may be employed, as well as coils of different shapes.

As previously explained, it is desirable to provide means for feeding one or more laminations at a time, depending upon the type of coil and its intended use, and for this purpose the feeding dogs 62 and 63 are vertically adjustable by means of a set screw 124, acting in opposition to a tension spring 125. In general practice this adjustability covers a range of from a single lamination to four laminations on one feeding travel. As shown in Fig. 5, the set screw 124 is threaded in an extension of a feeding dog member and is adapted to bear against a projection 126 which is also extended to serve as a connection for the spring 125.

Fig. 17 illustrates an alternative form of drive, which may be employed in lieu of the rotating wheel 83 and handle 84. In this alternative form the cross member 70 is pivotally connected by link 127 to arm 128 of a bell crank lever keyed upon vertical shaft 129, the opposite arm 130 of which carries an upwardly projecting handle 131 adapted to be grasped by the operator. In this form the arm 130 is oscillated in a horizontal plane to operate the machine, and this modified form renders it desirable to provide adjustable stop members for the reciprocating carriage. Thus, as shown in Fig. 17, adjustable bolts 132 are threaded through the right wall 21 and carry lock nuts 133, and corresponding adjustable bolts may be threaded through the left wall 20 to serve as stop elements in contact with the left cross member 65.

Referring to Fig. 6, the particular type of laminations disclosed may be conveniently cut from a blank with absolutely no loss of material and in a manner to provide insertion strips between laminations by using a blank as shown, which is cut upon lines 134, 135, and 136. Thereafter the spaces between the respective legs are formed by cutting upon lines 137, 138, 139, 140, 141, 142, 143, and 144. The width of the strips produced by this cutting operation is equal to the width of the portion joining the legs of the lamination, and the length of the strip is also equal to the length of this portion, wherefore these strips may be inserted between successive laminations in a completed coil, as shown in Fig. 2.

The operation of the machine has been largely indicated from the foregoing description, but in amplification, the arm 54 is swung upwardly to permit introduction of a coil. Plate 49 is then inserted through the opening 48 of a coil and the coil is inserted in the machine with the ends of the plate 49 resting in the pockets 50 and 51 to suspend the coil in position to receive the laminations. Arm 54 is then swung downwardly to the position shown in Fig. 8 and latch 58 is brought into locking engagement. This causes the wheels 57 to rest upon the angle members 40. By reference to Fig. 5, when operation of the machine is commenced, the lowermost lamination or laminations, as the case may be, in the stack 37 of right magazine 31 are shifted toward the left by reason of engagment with the feeding dogs 63. The central leg engages the plate 49 for guidance into the opening 48 of the coil 47, and the outer legs contact with the rollers 57, by means of which the legs are depressed and guided upon the members 40. Upon the next reverse reciprocation the operation is repeated from stack 36, and it will be understood that the laminations are fed and applied from the top. The upward inclination of the tables 23 and 24 prevents the advance edges of laminations from coming into abutting contact with laminations that have been previously applied, which not only adds to the smoothness of operation, but makes it possible to run the machine at high speed. As the feeding is continued the coil 47 remains stationary, but the laminations resting upon the members 40 are depressed, causing depression of the entire lamination supporting member 39 and the posts 40 in opposition to the spring 43. The member 111 of the measuring and releasing mechanism has previously been adjusted with respect to its length in conformity with the depth of the stack of laminations adapted to be applied to the coil, and likewise the collar 102 has been appropriately positioned upon the shaft 89, so that when the coil has received a sufficient number of laminations to completely fill the opening, as shown in Fig. 2, the driving mechanism is automatically disengaged, the coil removed, and the operation repeated.

While I have illustrated and described the preferred form of construction for carrying my invention into effect, this is capable of variation and modification without departing from the spirit of the invention. I, therefore, do not wish to be limited to the precise details of construction set forth, but desire to avail myself to such variations and modifications as come within the scope of the appended claims.

Having described my invention, what I claim as new and desire to secure by Letters Patent is:

1. A machine for applying laminations to a coil, comprising a left lamination supporting table, a right lamination supporting table, a lamination magazine mounted upon said left table, a second lamination magazine mounted upon said right table, means for supporting a coil between said tables for the reception of laminations, and means for alternately feeding laminations from said magazines, said tables being inclined upwardly toward the center of the machine in the lamination feeding direction.

2. A machine for applying laminations to a coil, comprising a left lamination supporting table, a right lamination supporting table, a lamination magazine mounted upon said left table, a second lamination magazine mounted upon said right table, means for supporting a coil between said tables for the reception of laminations, means for alternately feeding laminations from said magazines, means for operating said feeding means, and means for disengaging said operating means when the application of laminations has been completed, said tables being inclined upwardly toward the center of the machine in the lamination feeding direction.

3. A machine for applying laminations to a coil, comprising a left lamination supporting table, a right lamination supporting table, a lamination magazine mounted upon said left table, a second lamination magazine mounted upon said right table, means for supporting a coil between said tables for the reception of laminations, means for alternately feeding laminations from said magazines, said last named means comprising a reciprocatory carriage having lamination engaging dogs, means for operating said carriage, and means for disengaging said operating means when the application of laminations has been completed, said tables being inclined upwardly toward the center of the machine in the lamination feeding direction.

4. A machine for applying laminations to a coil, comprising a left lamination supporting table, a right lamination supporting table, a lamination magazine mounted upon said left table, a second lamination magazine mounted upon said right table, means for supporting a coil between said tables for the reception of laminations, means for alternately feeding laminations from said magazines, and a depressing member for guiding said laminations in the feeding operation, said tables being inclined upwardly toward the center of the machine in the lamination feeding direction.

5. A machine for applying laminations to a coil, comprising a left lamination supporting table, a right lamination supporting table, a lamination magazine mounted upon said right table, means for supporting a coil between said tables for the reception of laminations, means for alternately feeding laminations from said magazines, means for operating said feeding means, means for disengaging said operating means when the application of laminations has been completed, and a depressing member for guiding said laminations in the feeding operation, said tables being inclined upwardly toward the center of the machine in the lamination feeding direction.

6. A machine for applying laminations to a coil, comprising a left lamination supporting table, a right lamination supporting table, a lamination magazine mounted upon said left table, a second lamination magazine mounted upon said right table, and means for supporting a coil between said tables for the reception of laminations, said means comprising a pair of opposed pockets and a suspension plate adapted to pass through a coil and be supported by said pockets.

7. A machine for applying laminations to a coil, comprising a left lamination supporting table, a right lamination supporting table, a lamination magazine mounted upon said left table, a second lamination magazine mounted upon said right table, and means for supporting a coil between said tables for the reception of laminations, said means comprising a member adapted to pass through a coil and be supported by said tables, said member being adapted to serve as an upper guide for lamination plates to be placed on said coil.

CLAUDE RENÉ BLUZAT.